(12) United States Patent
Klotz et al.

(10) Patent No.: US 6,381,736 B1
(45) Date of Patent: Apr. 30, 2002

(54) METHOD FOR COMPILE-TIME TYPE-CHECKING OF ARGUMENTS FOR EXTERNALLY-SPECIFIED FORMAT STRINGS

(75) Inventors: Frank Klotz, Mountain View, CA (US); Dean Hiller, Shrub Oak, NY (US); Ian Kluft, San Jose; William B. May, Jr., Sunnyvale, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,311

(22) Filed: Oct. 12, 1999

(51) Int. Cl.[7] .................................................. G06F 9/45
(52) U.S. Cl. ........................ 717/4; 717/2; 717/5; 717/6; 717/8; 717/10
(58) Field of Search ................................ 717/4, 5, 2, 6, 717/8, 10; 714/37–39; 345/804–805

(56) References Cited

U.S. PATENT DOCUMENTS

| | | | | |
|---|---|---|---|---|
| 4,481,577 A | * | 11/1984 | Forson | 707/1 |
| 5,659,751 A | * | 8/1997 | Heninger | 709/305 |
| 5,701,487 A | * | 12/1997 | Arbouzov | 717/4 |
| 5,745,748 A | * | 4/1998 | Ahmad et al. | 707/10 |
| 5,822,589 A | * | 10/1998 | Diamant et al. | 717/4 |
| 5,845,120 A | * | 12/1998 | Reddy et al. | 717/4 |
| 5,857,070 A | * | 1/1999 | Satterfield et al. | 714/38 |
| 6,018,628 A | * | 1/2000 | Stoutamire | 717/5 |
| 6,209,040 B1 | * | 3/2001 | Acton et al. | 709/315 |
| 6,249,907 B1 | * | 6/2001 | Carter et al. | 717/4 |
| 6,311,327 B1 | * | 10/2001 | OaBrien et al. | 717/4 |
| 6,317,871 B1 | * | 11/2001 | Andrews et al. | 717/5 |

OTHER PUBLICATIONS

Chambers et al., Typechecking and Modules for Multimethods, 1995, p. 805–843, ACM.*
Molloy et al., Automatic Interoperability Test Generation for Source to Source Translators, 1998, p. 93–101, IEEE.*

* cited by examiner

Primary Examiner—Kakali Chaki
Assistant Examiner—John Q. Chavis
(74) Attorney, Agent, or Firm—Sierra Patent Group, Ltd.

(57) ABSTRACT

A method for type-checking format arguments during compile time which uses data in an external file. Data from the external file is converted into a generated source file suitable for "inclusion" in a program source file, which is the subject of compilation. The generated source file is compiled together with the program source file and performs, among other things, type-checking of format arguments contained within the program source file and the generated source file.

20 Claims, 2 Drawing Sheets

METHOD FOR COMPILE-TIME TYPE-CHECKING OF ARGUMENTS FOR EXTERNALLY-SPECIFIED FORMAT STRINGS

BACKGROUND OF THE INVENTION

1. Field of the Invention

This invention pertains generally to compile-time error checking. More particularly, the invention is a method for using compile-time function argument checking to validate variables to be substituted into format strings defined in external data files.

2. The Prior Art

In general, routing devices carry out the operation of reliably transferring network messages or packets within a network of coupled devices, or a collection of such networks. A router operating system (ROS) software which is executed by the routing device provides the basic functions for carrying out various router operations. More particularly, a reliable transfer protocol is provided by the ROS for carrying the routing operations. Additionally, a plurality of subsystems are provided in the ROS for carrying out other related routing tasks as is known in the art.

Occasionally during operation, the router may "crash" or otherwise fail to operate. In such case, it is desirable to present to the user of the routing device information in the form of "error messages" for resolving the problem in the "crashed" router device. Such information may include error codes which may be communicated to a technical support technician. The technician can research the error code and better assist the user in resolving the router problem. In addition to error codes, other information which may be provided to the user includes a message text which identifies the particular component of the hardware and/or the particular subsystem within the ROS which is causing the problem. Other explanatory or debugging data may also be provided as part of this process.

Providing error messages to the user is a task carried out by the ROS software executing in the router device. Prior art error message implementations are divided into two types. The first type provides the error message data (error codes, message text, etc.) within the program source code of the ROS software. The second type provides error message data externally from the program source file of the ROS, normally in an error message text file. There are disadvantages to both arrangements as described below.

In the former case, where error message data is provided within the program source file, updates or changes to the error message data are cumbersome or difficult to perform. Because the error message routines and error message data are combined with other router routines within the same ROS program source file, a programmer of the ROS would have to search the program source code for the location of the message routines and message data to make changes and corrections. Furthermore, if a programmer were working with more than one ROS program source file, such as when a programmer is working on several revisions of an ROS file, the programmer would have to make the same changes in each ROS program source file, making global error message data change cumbersome and time consuming.

The main advantage of including the error message data in the ROS program source file is the ability to perform compile-time type-checking of variable format arguments. To display an error message to a user, a function within the ROS is normally called (printf, for example) which accommodates one or more "arguments" or "parameters" associated with the message.

During compilation of the program source file, the compiler provides type-checking of arguments to format specifiers in message-formatting function calls. For example, an illustrative function call may be:

printf ("An error of type %d was generated by %s", ID, SRC)

In the above example, the call to the function printf includes three arguments, where the first argument is a literal "format string" having the value "An error of type %d was generated by %s". This "format string" argument is "non-variable" in that its value is fixed in the program source file. In general, this argument value is "hard-coded" and entered into the program source file by the programmer of the program source file. The above format string includes two "format specifiers" (%d and %s), each starting with a "%" symbol followed by an argument type specifier. The remaining arguments (ID and SRC) are "variable". The format specifiers (%d and %s, in this case) in the format string argument dictate the number and type of arguments to follow in the function call. At compile time, the compiler checks to verify that the ID argument is the proper data-type for the "%d" format specifier and that the SRC argument is the proper data-type for the "%s" format specifier.

Where the data-type for one or more of the arguments is inappropriate for its corresponding format specifier in the format string argument, a compilation error is generated which points out the type-mismatch in the function call. The ROS programmer can then correct the type-mismatch error and recompile the program source file. Such detection of type-mismatch errors is desirable to correct defects in the program source code of the ROS prior to public release of the ROS. If such type-mismatches are not discovered during or prior to compilation, a potential error or malfunction may result during the run-time execution of the ROS of the router.

In the second error message implementation technique, the error message data (error codes, error message text, etc.) is stored in a separate file from the program source file, normally in an "error message text file". By providing this error message data in an external text file, the message information can be easily accessed and modified by a programmer. Normally, the error message text file organizes the message data in "sectional" format wherein each section applies to a certain component or subsystem of the router, and each section may include one or more messages related to that section. Another benefit associated with externally providing the message data is the ability to use the same error message text file with multiple program source code implementations.

In addition, an external message text file greatly simplifies the process of providing error-messages in multiple languages. For example, where IPV4 error messages are provided in an "IPV4.msg" file, multiple language support could be provided by creating an "IPV4.french.msg" which contains the French translation of the same error messages provided in the "IPV.msg" file.

Error message data are provided to the program source file by calling a function in the program source file which retrieves the pertinent error message data, such as:

IP_bad_route_format=get format (IP_bad_route);

During router operation, the above command retrieves the message text associated with a bad route from the error message text file and stores the message into the variable "IP_bad_route_format". The variable "IP_bad_route_format" contains the functional equivalent value of the "literal string" argument as in the first error message implementation, but obtains its value at "run-time" during router execution. The variable "IP_bad_route_format" is used in conjunction with the output function (printf) to display the error message to the user. For example, the printing call might be:

printf (IP_bad_route_format, ID, SRC)

The error message is then displayed to the user for troubleshooting the problem associated with the present error. However, since the IP_bad_route_format value is defined at run-time, during compilation of the program source file, the value of the IP_bad_route_format variable is unknown. Unlike the first error message implementation where the message text is "hard-coded" with the output function printf, the content of the message text and thus the format specifiers within the message text provided by the IP_bad_route_format variable is unknown to the compiler. Accordingly, the compiler will not perform type-checking of such function call statements (i.e., the compiler will not check whether the ID and SRC arguments match the data-type specified by the format specifiers in the IP_bad_route_format variable). Because the compiler does not perform type-checking with respect to this second type of error messaging system, the risk of run-time type-mismatches is increased. As noted above, run-time type-mismatches may result in router faults or errors during run-time execution.

Accordingly, there is a need for a compile-time method for type-checking format arguments which utilizes an external message text file. The present invention satisfies these needs, as well as others, and generally overcomes the deficiencies found in the background art.

An object of the invention is to provide a method for compile-time type-checking of format arguments which overcomes the deficiencies of the prior art.

Another object of the invention is to provide a method for compile-time type-checking of format arguments which uses data from an external file.

Another object of the invention is to provide a method for compile-time type-checking, of format arguments which produces a generated source file from an error message text file which is compiled together with a program source file.

Another object of the invention is to provide a method for compile-time type-checking of format arguments which converts data from an error message text file into a generated source file which is suitable for inclusion into a program source file.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method for type-checking format arguments during compile time which uses data in an external file. The invention converts data from an external error message text file into a generated source file suitable for "inclusion" in a program source file. The invention compiles the program source file together with the generated source file and performs, among other things, type-checking of format arguments contained within the program source file and the generated source file. The method of present invention is implemented by software which is stored on a computer-readable medium, such as computer memory or a CD-ROM, for example.

The error message text file of the present invention typically includes message data which includes error codes, message text, and other relevant data for debugging errors as is known in the art. This data contained within the error message text file is external to data contained within the program source file, which contains operating instructions for the router, and is the subject of compilation. In the present invention the program source file is typically compiled into a router operating system (ROS) library file, which may be included as part of the router operating system software.

Normally the error message text file divides message data into one or more sections, where each section pertains to a system or hardware function within a router device. Each section related to a system or hardware function may be further subdivided into one or more "message" subsections, where each subsection relates to a particular error that may be associated with the particular system or hardware function. Each of the "message" subsections will contain the detailed code, message text, and other data related to a particular problem within the router. While the data within the error message text file is described herein using section and subsection divisions, other methods for storing data within an external file as is known in the art may be used without departing from the scope of the present invention.

The invention converts the error message text file into a "generated source" file, which is included into the program source file as described further below. In general, the invention generates a function definition in the generated source file for each "message" subsection contained within the error message text file. Each such function definition will be defined with a calling sequence that requires the caller (in the program source file) to pass the correct number and type of arguments to match any format specifier(s) in the corresponding error message text file. For example, an illustrative function definition generated by the invention may be:

Void ROS_error_IP_bad_route (int ID, char*SRC)
{
. . .
printf (IP_bad_route_format, ID, SRC)
. . .

The above sample generated function includes a call to the output function (i.e., printf (IP_bad_route_format, ID, SRC)). Since the first (format string) argument (IP_bad_route_format) is a variable rather than a literal text string, the compiler cannot check the arguments (ID and SRC) against the format of the first argument (IP_bad_route_format).

However, the pre-processing step that generating the function determined that the format string requires one Integer argument and one character string pointer argument and generated the function ROS_error_IP_bad_route to require those arguments. Thus, any program source file that calls ROS_error_IP_bad_route must provide two arguments of these two exact types, or a compile error will occur.

The generated source file is included into the program source file using a "% include" command contained in the program source file or other like include command known in the art. For example, a generated source file named "errors_gen.h" would be included into a program source file with the following command:

%include erorrs_gen.h

Normally, the above step of including the generated source file is carried out manually by a programmer inserting the "include" command into the program source file. The invention then compiles the program source file, which in a presently illustrative example is a router operating system (ROS) source file.

During compilation of the program source file, the compiler checks the program source file for errors. Additionally, the compiler checks the included generated source file (errors_gen.h, for example) for errors.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
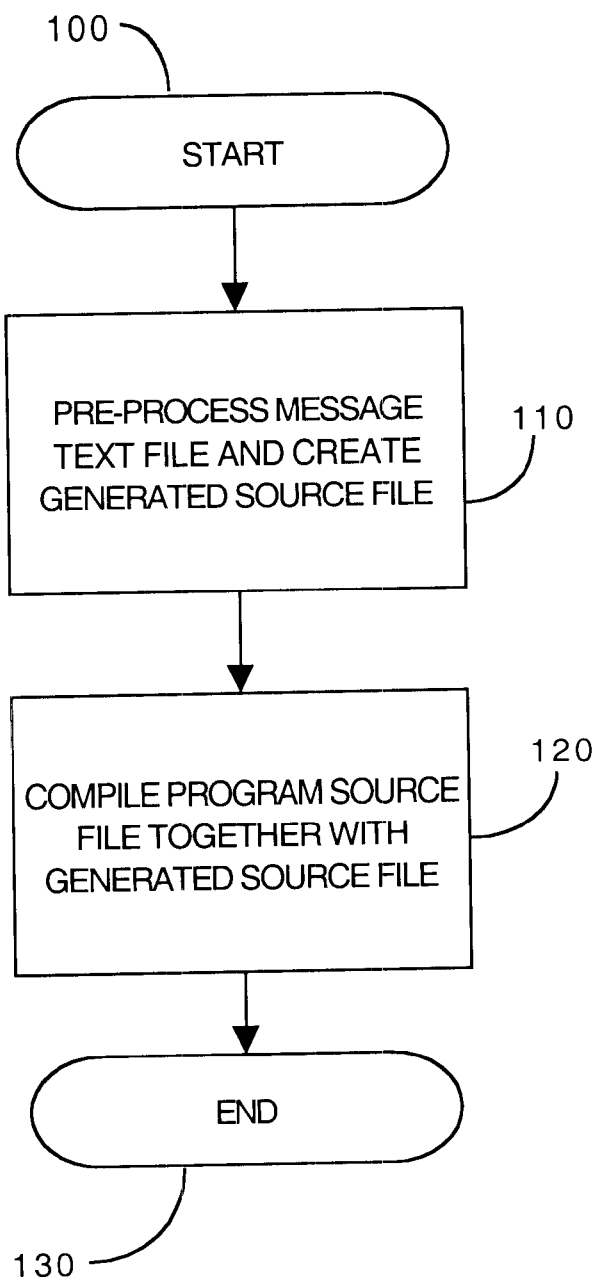
FIG. 1 is a flow chart showing generally the steps of providing compile-time type-checking of format arguments according to the present invention.
Figure 2:
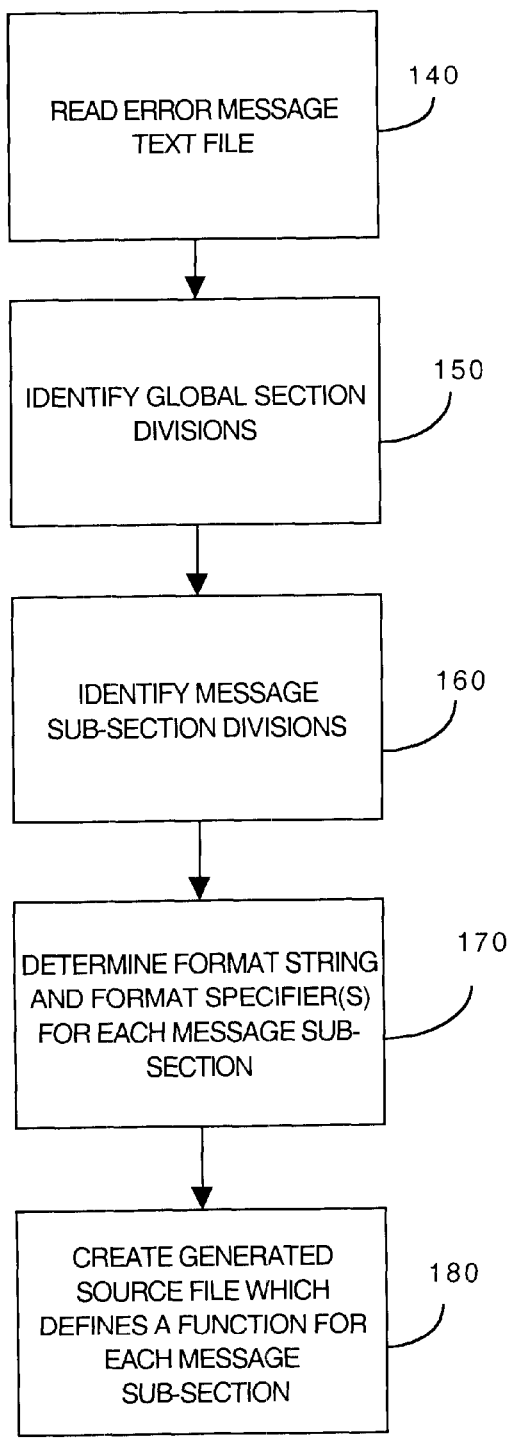
FIG. 2 is a flow chart showing generally the steps of converting an external error message data file into a generated source file suitable for inclusion into a program source file and compilation therewith.

Referring more specifically to the drawings, for illustrative purposes the present invention is embodied in the method outlined in FIG. 1 and FIG. 2. It will be appreciated that the method may vary as to details and the order of the steps, without departing from the basic concepts as disclosed herein. The invention is disclosed generally in terms of a method for compile-time type-checking of format arguments utilizing an external data file, although numerous other uses for the invention will suggest themselves to persons of ordinary skill in the art.

Referring first to FIG. 1, the method for providing compile-time type-checking of format arguments according to the present invention is generally shown. In a presently preferred embodiment, the invention comprises an executable application or script software written in PERL which is executed by a user on a computer or other data processing means. This PERL script is only illustrative and other programming languages as are known in the art may be used in conjunction with the present invention. The script, once initiated, carries out the steps described herein.

The invention is suitable for use with one or more "external" data files and one or more "program source" files. By way of example, the external data file described herein is an "error message text" file which includes error-related information, such as error codes, message text, and other data. As described above, since the information in the error message text file is organized by section, the user or programmer may easily access and modify the information contained therein. The invention provides that a single external data file may be used in conjunction with a plurality of program source files.

As noted above, the "error message text" file contains error codes, message text and other data useful for debugging router problems, and the "program source" file comprises ROS software code for handling errors encountered by a router device. It will be appreciated that the present example is only illustrative, and many other applications may be suitable for use with the present invention At step 100, a user of the invention initiates the script software. Normally, the user will initiate the script of the present invention when the user has updated or otherwise changed data within the error message text file or the ROS program source file. Whereas in the prior art, the user would simply invoke the compilation process after updating the error message text file or the ROS program source file, in the present invention, the user invokes the script described herein. Step 110 is then carried out At step 110, the script "pre-processes" the error message text file. This step comprises the step of converting the error message text file into a generated source file suitable for inclusion in the ROS program source file. This step is described in further detail in conjunction with FIG. 2 below. Prior to creating the new generated source file, the script deletes or otherwise removes prior generated source files, if any. After the generated source file is created, step 120 is then carried out.

At step 120, the script invokes the compiler to compile the ROS program source file. The ROS program source file includes a statement of code which incorporates the generated source file of step 110. A typical "include" statement is:

%include errors_gen.h
where "errors_gen.h" is the name of the generated source file of step 110. This compilation step checks the code contained within the ROS program source file as well as other "included" files. Thus, the code contained within the generated source file of step 110 is also checked by the compiler.

As described above, and below in conjunction with FIG. 2, the generated source file of step 110 includes a function definition for each "message" subsection of the error message text file. The function generated is defined to require the same number and types of arguments, in the same order, as a printf or other formatting function would require for the corresponding format string. Code within the program source that wishes to output that message must call the generated function with the correct arguments (i.e., correct number of arguments, correct type of arguments, correct order of arguments). Any type mismatch errors are thus detected during compile-time rather than during execution or run-time, thereby reducing the risk of errors when executing the ROS system software generated by the present invention.

At step 130, the compilation step terminates. Errors, if any, which occurred when error checking the ROS program source file and the included generated source file are displayed to the user of the invention and the user may take corrective measures if necessary.

Referring now to FIG. 2, the steps of converting an "external data" file ("error message text" file, for example) into a generated source file suitable for inclusion into a program source file and compilation is generally shown. As noted above, the invention is suitable for use with one or more "external" data files and one or more "program source" files. FIG. 2 illustrates the steps of converting a single error message text file. To convert a plurality of external data files, the steps illustrated in FIG. 2 may be carried out for each such external data file.

At step 140, the script of the invention reads the error message text file. In the present illustrative embodiment, the error message text file organizes its data using sections and subsection divisions, where each "global" section pertains to a system or hardware function within a router device, and where each of the subsections contains detailed code, message text, and other data related to a particular problem within the router. Step 150 is then carried out.

At step 150, the script identifies and locates each "global" section of the error message text file. Each "global" section may have one or more "message" subsections. Normally, the script iterates through each section and through each subsection within its corresponding section using a looping routine as is known in the art. Step 160 is then carried out.

At step 160, the script identifies and locates each "message" subsection division within the error message text file. As noted above, the script will iterate through each "message" subsection within its corresponding "global" section. Step 170.

At step 170, the script determines the format string for each "message" subsection. As the script iterates through each "message" subsection, the format for the message text is ascertained. For example, the following is a portion of the error message text file:

Section: IP

Message: Bad_Route

Format: "The %d route from %s does not exist"

In the above example, the format obtained by the script is "The %d route from %s does not exist" for the message "bad route" in the section "IP". The format is obtained for each "message" subsection. The script also ascertains the proper arguments (number of arguments, type of arguments, and order of arguments) required by the format specifiers, if any, from the format string (%d and %s, in this case). Step 180 is then carried out.

At step 180, the script creates a generated source file suitable for inclusion into the ROS program source file. The generated source file comprises a function definition for each "message" subsection within the error message text file. Each function definition defines within its body a call to an output function (printf, for example) and includes the format string obtained in step 170 as its first argument. Additionally, the function is defined to require the same number and types of arguments, in the same order, as required by the format string as determined from step 170. Thus any calling statements within the program source must use the correct arguments (number of arguments, type of arguments, and order of arguments) as defined by the function definition in the generated source file, which is the correct arguments that is required by the format string. An illustrative function definition is:

Void ROS_error_IP_bad_route (int ID, char * SRC)
{
. . .
printf (IPT_bad_route_format, ID, SRC)
. . .
}

In the above example, a calling statement in the program source to this generated function would require one Integer argument and one character string pointer argument. The script generates a function definition for each "message" subsection. At the conclusion of step 180, generation of the generated source file suitable for inclusion in the program source file is complete.

The ROS program source file includes code which calls the functions defined in the generated source file. For example, a call to display the error message for a bad route may be issued by the following command:

If (route_fail)
{
ROS_error_IP_bad_route (ID, SRC);
. . .
}

Compilation of the program source file together with the included generated source file may then be carried out as described in step 120 of FIG. 1.

Accordingly, it will be seen that this invention provides a compile-time method for type-checking format arguments which utilizes an external message file. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for error-checking format arguments comprising:
   a) providing a program source file for compilation;
   b) providing an error message text file having data for output by said program source file;
   c) converting said error message text file into a generated source file suitable for inclusion into said program source file;
   d) including said generated source file into said program source file; and
   e) compiling said program source file together with said generated source file.

2. The method of claim 1 wherein said error message text file comprises global sections, each global section having at least one message subsection, each subsection having message data for output by said generated source file, said generated source file having a function definition for each said message subsection within each said global section.

3. The method of claim 2 wherein each said function definition comprises a function body having a function call which includes non-variable arguments.

4. The method of claim 1 wherein said converting said data file into a generated source file comprises:
   a) reading said error message text file;
   b) identifying global sections within said error message text file;
   c) identifying message subsections within each said global section;
   d) iterating through each said global section and each said message subsection;
   e) determining format string for each said message subsection; and
   f) creating a generated source file having a function definition for each message subsection in said error message text file.

5. The method of claim 4, further comprising determining at least one format specifier for each said format string before creating said generated source file.

6. The method of claim 5, wherein said function definition requires arguments for each said format specifier.

7. The method of claim 4, further comprising determining a plurality of format specifiers for each said format string before creating said generated source file.

8. The method of claim 7, wherein said function definition requires arguments for each said format specifier.

9. The method of claim 1, wherein said steps are provided in a perl script.

10. The method of claim 1, wherein said converting said data file into a generated source file comprises:
    a) reading said error message text file;
    b) determining format string of an error message from said error message text file;
    c) determining at least one format specifier for said format string; and
    d) creating a generated source file having a function definition for said error message in said error message text file, said function definition requiring arguments for each said format specifier.

11. A method for converting an error message text file into a generated source file suitable for inclusion into and compilation with a program source file comprising:

a) reading said error message text file;

b) determining format string of an error message from said error message text file;

c) determining at least one format specifier for each said format string before creating said generated source file; and d) creating a generated source file having a function definition for said error message in said error message text file, said function definition requiring arguments for each said format specifier.

12. A program storage device readable by a machine, tangibly embodying a program of instructions executable by the machine to perform a method for converting an error message text file into a generated source file suitable for inclusion into and compilation with a program source file, the method including:

a) reading said error message text file;

b) determining format string of an error message from said error message text file;

c) determining at least one format specifier for each said format string before creating said generated source file; and d) creating a generated source file having a function definition for said error message in said error message text file, said function definition requiring arguments for each said format specifier.

13. A program storage device readable by a machine, tangibly embodying a program of instructions executable by the machine to perform a method for error-checking format arguments, the method including:

a) providing a program source file for compilation;

b) providing an error message text file having data for output by said program source file;

c) converting said error message text file into a generated source file suitable for inclusion into said program source file;

d) including said generated source file into said program source file; and e) compiling said program source file together with said generated source file.

14. The program storage device of claim 13, wherein said converting said data file into a generated source file comprises:

a) reading said error message text file;

b) identifying global sections within said error message text file;

c) identifying message subsections within each said global section;

d) iterating through each said global section and each said message subsection;

e) determining format string for each said message subsection; and f) creating a generated source file having a function definition for each message subsection in said error message text file.

15. The program storage device of claim 14, said method further comprising determining at least one format specifier for each said format string before creating said generated source file.

16. The program storage device of claim 15, wherein said function definition requires arguments for each said format specifier.

17. The program storage device of claim 14, further comprising determining a plurality of format specifiers for each said format string before creating said generated source file.

18. The program storage device of claim 17, wherein said function definition requires arguments for each said format specifier.

19. The program storage device of claim 13, wherein said steps are provided in a perl script.

20. The program storage device of claim 13, wherein said converting said data file into a generated source file comprises:

a) reading said error message text file;

b) determining format string of an error message from said error message text file;

c) determining at least one format specifier for said format string; and d) creating a generated source file having a function definition for said error message in said error message text file, said function definition requiring arguments for each said format specifier.

\* \* \* \* \*